(12) United States Patent
Gouleau et al.

(10) Patent No.: US 11,784,844 B2
(45) Date of Patent: Oct. 10, 2023

(54) METHOD AND DEVICE FOR MANAGING CONTENT CONSUMPTION IN AN EXTENDED HOME NETWORK

(71) Applicant: Orange, Issy-les-Moulineaux (FR)

(72) Inventors: Emmanuel Gouleau, Chatillon (FR); Jean-Bernard Leduby, Chatillon (FR)

(73) Assignee: Orange, Issy-les-Moulineaux (FR)

(*) Notice: Subject to any disclaimer, the term of this patent is extended or adjusted under 35 U.S.C. 154(b) by 8 days.

(21) Appl. No.: 17/352,119

(22) Filed: Jun. 18, 2021

(65) Prior Publication Data
US 2021/0399914 A1     Dec. 23, 2021

(51) Int. Cl.
*H04L 12/28* (2006.01)
(52) U.S. Cl.
CPC ...... *H04L 12/2816* (2013.01); *H04L 12/2834* (2013.01)
(58) Field of Classification Search
CPC .................. H04L 12/2816; H04L 12/2834
See application file for complete search history.

(56) References Cited

U.S. PATENT DOCUMENTS

| | | | | |
|---|---|---|---|---|
| 7,043,532 B1* | 5/2006 | Humpieman | ....... | H04L 12/2805 709/208 |
| 10,708,265 B2* | 7/2020 | Raje | ............... | G06F 9/44542 |
| 10,805,293 B2* | 10/2020 | Kim | ............... | H04L 63/0853 |
| 11,095,534 B1* | 8/2021 | Dunsmore | ............. | H04L 67/51 |
| 2007/0276925 A1* | 11/2007 | La Joie | ............... | H04N 21/835 709/219 |
| 2008/0209491 A1* | 8/2008 | Hasek | ............... | H04N 21/4788 348/E7.071 |

(Continued)

FOREIGN PATENT DOCUMENTS

| | | | | |
|---|---|---|---|---|
| CA | 2653220 C | * | 2/2014 | ........ G06Q 30/0256 |
| FR | 3 089 372 A1 | | 6/2020 | |
| FR | 3089372 A1 | * | 6/2020 | ........... H04L 12/282 |

OTHER PUBLICATIONS

French Search Report for French Application No. 2006548, dated Feb. 24, 2021.

(Continued)

*Primary Examiner* — Patrice L Winder
*Assistant Examiner* — Angela M Widhalm De Rodriguez
(74) *Attorney, Agent, or Firm* — Knobbe, Martens, Olson & Bear, LLP (57) ABSTRACT

A device for managing an extended home network is disclosed. This extended home network comprises a main home network and a secondary network, including an equipment adapted to execute an application based on a uniform resource locator address that enables the equipment to access, via a communication network, at least one piece of data enabling the execution of the application on the equipment. The management device is configured to: receive, via the main home network, a request to associate the equipment from the secondary network with the application, store a list of equipment from the secondary network in association with the application, receive a request to launch the application, from a terminal, via the secondary network, this request comprising an identifier of the application, provide the terminal, on reception of the launch request, with the list of equipment, receive, from the terminal, an identifier of an equipment on the list.

11 Claims, 4 Drawing Sheets

(56) References Cited

U.S. PATENT DOCUMENTS

| | | | | |
|---|---|---|---|---|
| 2011/0029653 | A1* | 2/2011 | Stein | H04L 12/2809 |
| | | | | 709/223 |
| 2014/0282986 | A1* | 9/2014 | Leung | H04L 63/10 |
| | | | | 726/9 |
| 2016/0241642 | A1* | 8/2016 | Liu | H04L 65/102 |
| 2018/0248973 | A1* | 8/2018 | Cook | H04L 63/08 |
| 2019/0036727 | A1* | 1/2019 | Matson | H04L 63/1408 |
| 2021/0058266 | A1* | 2/2021 | Shoesmith | H04L 12/2807 |

OTHER PUBLICATIONS

French Written Opinion for French Application No. 2006548, dated Mar. 4, 2021.

\* cited by examiner

METHOD AND DEVICE FOR MANAGING CONTENT CONSUMPTION IN AN EXTENDED HOME NETWORK

CROSS-REFERENCE TO RELATED APPLICATIONS

This application claims foreign priority to FR 2006548, filed Jun. 23, 2020, the contents of which is incorporated by reference herein in its entirety.

BACKGROUND

Field

The invention concerns the management of an extended home network connected to a data communication network, such as the Internet. More specifically, the invention concerns managing the launch of multi-screen applications within an extended home network. Extended home network of a user, also known as Virtual Home Network, shall mean the entity comprising the main home network of the user and a secondary network, which may be the home network of his/her secondary residence or a visited network, such as the home network of a third party or a visited mobile network or the Internet.

Description of the Related Technology

Today, there exist smartphone applications which make it possible to launch, via the smartphone, applications or services to which a user has subscribed, on another piece of user equipment. For example, most Internet service providers that provide their subscriber with a TV service, i.e. a digital content consumption service, provide them with applications to install on a mobile terminal (for example smartphone, tablet, etc.) which makes it possible to launch a TV service on a second screen, typically a television or a decoder connected to the home gateway, via the mobile terminal.

Another example is the playing of videos broadcast on a video sharing platform, for example YouTube®, on a multimedia gateway, for example a Google ChromeCast® dongle or a stick equipped with a TV decoder, connected to a display device, for example a television or a video projector. To launch such a service, the user installs a control application on their mobile terminal which enables them to ask the multimedia gateway to play the video. According to this example, the multimedia gateway connected to a communication network receives video streams from the video sharing platform. The broadcasting of videos is controlled by the application installed on the mobile terminal.

Such digital content consumption services or applications are commonly termed TV service or multi-screen application.

There currently exist several service offerings for digital content consumption, available on a local home network or while roaming, to which the user can subscribe:

- Internet Protocol Television (IPTV) comprises in particular live television, Video on Demand (VOD), and is accessible via a local home network connected to a data communication network. TV services and access rights to these TV services (Digital Rights Management or DRM) are generally associated with the user's subscription (for example their subscription to a fiber optic or a broadband connection). These access rights are managed locally by components of the home network, and limited to TV decoders (Set Top Box or STB) of the local home network. Access rights to these TV services are received by the TV decoder in order to decode the stream of data;
- Over The Top (OTT), is a delivery service of audio, video and other media on the Internet without the participation of a traditional Internet service provider in controlling or distributing digital content. TV services and TV access rights are associated with the user's main e-mail account, which itself is associated with the user's broadband or fiber optic subscription. These access rights are managed by components located within the user's extended home network. Currently, solutions for managing the use of and access rights to the OTT offering proposed by OTT service providers (Netflix®, Disney+®, etc.) are based on a component located either in the "Cloud" (just like the operation of YouTube), or locally on a piece of equipment such as a Set Top Box (STB) or a HDMI TV stick (for example the Clé TV® stick by Orange). These equipment management solutions remain extremely vertical and specific to an OTT provider. They are not visible to the Internet access operator and do not enable the latter to provide a digital content aggregation service;
- mobile roaming offers, for which services and access rights to digital content are associated with the user's mobile subscription.

Widespread Internet access, in particular via fiber optics, provides users with greater Internet bandwidth and enables them to use an increasing amount of Internet services, in particular on different household equipment no longer exclusively located locally at the level of the user's main home, but located in an extended home network, i.e. a network comprising the user's main home network and a secondary network, which may be the home network of their secondary residence or a visited network, such as the home network of a third party or a visited mobile network or the Internet.

Furthermore, the development of software approaches to virtualize network services and functions or Network Function Virtualization (NFV) and Software Defined Network (SDN), have made it possible to broaden the current home gateway and to develop new services on this gateway such as:

- "Super LAN": extended Local Area Network (LAN) between two home gateways (in "bridge" mode) "in a single click", with residential point-to-multipoint VPNs (Virtual Private Networks) and the discovery of equipment in two distinct home environments;
- "Parental control": greater parental control than what is currently available on the home gateway, in particular by using more complex processing (for example by using Artificial Intelligence). This improved parental control makes it possible, for example, to go beyond URL (Uniform Resource Locator) filtering available on the home gateway;
- "Virtual NAS" (Network Attached Storage): a personal network disk in a Virtual Home Gateway component in the network with the following characteristics: always on, remote access, successful backup, etc.

These NFV and SDN approaches make it possible to extend the services available on the home network beyond the physical network, i.e. the subscriber's line (such as for example the fiber-optic link) and enable the user to use these wherever the former may be. The services are no longer connected to the user's home, but to the user themselves.

It has been found that the user's home environment is increasingly complex and can therefore comprise a large amount of household equipment requiring an Internet connection and spread throughout an extended network environment. The network blocking point is now situated at the level of the user's extended home network and no longer at the level of their access network.

The decentralized surge in the different service offerings mentioned here above, in which each application or service is connected to a home (for example to the user's fiber-optic line) or to the user (such as for example to their e-mail address), does not make it possible to control these services within the user's extended home environment. This can impact the quality of the service provided to the user if the latter wants to benefit from all of their TV services subscribed outside their main home.

In addition, there is no centralized control at user level (access rights, parental control, for example).

SUMMARY OF CERTAIN INVENTIVE ASPECTS

The invention improves the state of the art. In this regard it proposes a device for managing an extended home network. This extended home network comprises a main home network and at least one secondary network, said at least one secondary network comprising at least one piece of equipment adapted to execute at least one application based on a uniform resource locator address (URL). This uniform resource locator address enables the equipment to access, via a communication network, at least one piece of data enabling the execution of said at least one application on the equipment. The management device according to the invention is configured to:
  receive, via the main home network, a request to associate said at least one piece of equipment from the secondary network with said at least one application,
  memorize a list of equipment from the secondary network in association with said at least one application,
  receive a request to launch said at least one application, from a terminal, via the secondary network, this request comprising an identifier of said at least one application,
  provide the terminal, on reception of the launch request, with the list of equipment,
  receive, from the terminal, an identifier of a piece of equipment from the list.

In this way, according to the invention, a device for managing the extended home network of a user is proposed. Extended home network of a user, also known as Virtual Home Network, shall mean the entity comprising the main home network of the user and a secondary network, which may be the home network of their secondary residence or a visited network, such as the home network of a third party or a visited mobile network or the Internet. Such a device for managing the extended home network may be comprised in a piece of equipment from the operator's network to which the user is subscribed. The storage and possibly processing resources in the operator's communication network (resources in the "Cloud"), which are dedicated to the user, are part of the user's extended home network.

Main home network shall mean a local communication network located in a main residence corresponding to the dwelling occupied on a regular basis and primarily, by the user. It is the local communication network for which the user has subscribed to an Internet access service with the operator. Secondary network shall mean a communication network used temporarily by the user, which may be the home network of their secondary residence, or a visited mobile or fixed network.

Advantageously, such a device for managing the extended home network centralizes the information necessary for executing applications likely to be executed by a piece of equipment comprised in the user's extended home network, and controlled via a user terminal, such as for example a smartphone. In other terms, the management device according to the invention centralizes the access rights to the multi-screen applications of equipment in the user's extended home network, and in particular equipment comprised in a secondary network, such as for example a local home network of a secondary residence, or a home network of a third party whom the user is visiting.

For this, the device makes it possible to configure remote access to multi-screen services or applications subscribed by the user, via the main home network, by associating each piece of equipment from the secondary network with access rights to a given service or application. It is therefore possible to configure remote access to audiovisual services subscribed by the user from their main home network. In other terms, the user can therefore configure to whatever multi-screen service or application they can access outside their main home.

The device for managing the extended home network then memorizes a list of equipment from the secondary network, authorized to access a multi-screen application subscribed by the user and sends the user the list of equipment from the secondary network on which the application can be executed, so that the user can select the desired equipment.

The management device according to the invention therefore makes it possible to separate the current connection of a subscription to services subscribed by the user, such as for example an IPTV or OTT service, from the main home network itself.

In this way, the execution of the multi-screen application is no longer linked to a piece of equipment necessarily belonging to the main home network. The service rights are connected to a user and accessible from the "extended" home network (extended LAN) and no longer to their main local home network (LAN), while remaining controlled by the operator. In other terms, the subscription to a digital content service is not longer connected to the line (broadband, fiber optic, etc.), but to the user.

In this way, through the invention, management of the launch of such applications is centralized at the level of the device for managing the extended home network, comprised for example in a virtual gateway on the operator's communication network (Cloud). Such centralization enables more flexibility to control the launch of available applications, for example for authenticating or authorizing the launch of an application. The use of a centralized management device makes it possible to discover the different pieces of equipment on a secondary network belonging to the user's extended home network and to update the availability and compatibility of this equipment to execute the application.

Indeed, according to the prior art, a request to launch an application is transmitted from the terminal directly towards the piece of equipment that must execute the application, and therefore does not make it possible to control this launch.

In addition, the device for managing the home network according to the invention, makes it possible to configure the communication sessions between the application and the visualization equipment selected by the user and to ensure greater security and confidentiality for the user. Indeed, according to the invention, the requests to launch and provision of the URL are performed via the user's extended home network. In this way, no information concerning the applications available or the equipment available is transmitted outside the extended home network. In contrast, according to the prior art, for certain services provided by third party providers, other than the operator to whom the user is subscribed, the requests to launch an application are transmitted to a server of the third party provider outside the extended home network. In this way, this centralization also makes it possible to control the messages exchanged and therefore to control the network load of the extended home network and of the communications transmitted to or received from the communication network to which the extended home network is connected.

According to one particular embodiment of the invention, the device for managing an extended home network is also configured to:

memorize a list of applications comprising at least one identifier of said at least one application, this identifier being associated with the uniform resource locator address,
  provide the equipment or the terminal, via the secondary network, with the uniform resource locator address associated with the identifier.

According to this embodiment, the management device centralizes the uniform resource locator addresses, making it possible to obtain the data necessary to execute the application. For example, in the case of a VOD application, the uniform resource locator address enables access to audiovisual content, for example content registered in the network at the user's request, or access to a web page, enabling the selection of audiovisual content in a catalog. Other examples of data are possible, as are other examples of applications. In this way, in another example, in the case of an OTT service application (for example YouTube® or Netflix®), the uniform resource locator address enables access to the catalog of audiovisual content proposed by the OTT service to which the user has subscribed.

According to another particular embodiment of the invention, the list of equipment from the secondary network associated with said at least one application is updated on reception of a registration notification for a new piece of equipment in the secondary network in relation to a piece of capability information concerning the new equipment comprised in the registration notification.

According to this particular embodiment of the invention, the use of a centralized management device for an extended home network enables management of equipment for visualizing given content (TV programs, VOD by subscription) or for consuming a given Internet service (YouTube®, NetFlix®, etc.).

Advantageously, the management device has a list of equipment connected to the extended home network and capable of executing the application which is always up to date.

For example, such capability information may correspond to a format of audiovisual content, supported or not, for example a particular compression standard, or a 4K format, or a network quality setting, for example a minimum throughput available on the secondary network to play a video, or any other setting.

In this way, the device according to the invention makes it possible in particular to manage the qualities available on this equipment and to visualize the desired content through control by the operator of the network configuration, therefore improving the Quality of Service (QoS). This control may be static (subscription for access to a fixed and mobile network) and/or dynamic (bandwidth test from the mobile application). In other terms, the client themselves does not have to select the quality of the video as they would do in the case of an OTT service for example. In the case of an OTT video, the quality of restoration of the video could be poor if the client's network capacity is insufficient. The device for managing an extended home network according to the invention, enables the operator to choose the optimum quality according to the configuration of the user's extended home network, which they know.

According to another particular embodiment of the invention, the device for managing an extended home network is also configured to check that the equipment is authorized to execute the application, said uniform resource locator address being provided to the equipment by the device for managing the extended home network if this equipment is authorized to execute the application.

According to this particular embodiment of the invention, before launching execution of the application on the equipment, the management device implements an authorization check. For example, such a check may make it possible to check the user's access rights to the application service requested, or to apply parental control to the application requested or the use of the equipment concerned, or to check that the home network has the necessary throughput to enable the equipment to execute the application requested.

According to another particular embodiment of the invention, the list of equipment associated with an application may be determined in relation to a piece information concerning equipment preference which is associated with the application or with a group of applications and which is provided by the user, for example.

The invention also concerns a virtual home gateway comprising a management device according to any one of the particular embodiments described here above.

The invention also concerns a piece of equipment placed in a communication network and comprising resources dedicated to the extended home network of a user subscribed to a communication network operator. Such equipment comprises a management device according to any one of the particular embodiments described here above.

The invention also concerns a method for managing an extended home network. This extended home network comprises a main home network and at least one secondary network, said at least one secondary network comprising at least one piece of equipment adapted to execute at least one application from one uniform resource locator address. This uniform resource locator address enables the equipment to access, via a communication network, at least one piece of data enabling the execution of said at least one application on this equipment. Such a method comprises:

the reception, via the main home network, of a request to associate said at least one piece of equipment from the secondary network with said at least one application,
  the memorization of a list of equipment from the secondary network in association with said at least one application,
  the reception of a launch request from said at least one application, from a terminal, via the secondary network, this request comprising the identifier of said at least one application,
  the provision, to the terminal, on reception of the launch request, of the list of equipment,
  the reception, from the terminal, of an identifier of a piece of equipment from the list.

According to one particular embodiment of the invention, the method also comprises:

the memorization of a list of applications comprising at least one identifier of said at least one application, this identifier being associated with the uniform resource locator address, the provision, to said equipment or to the terminal, via the secondary network, of the uniform resource locator address associated with this identifier.

According to another particular embodiment of the invention, the method for managing an extended home network also comprises:

the reception of a registration notification for a new piece of equipment in the secondary network comprising a piece of capability information concerning this new equipment;

an update of the list of equipment from the secondary network associated with said at least one application in relation to the capability information concerning the new equipment.

According to another particular embodiment of the invention, the method for managing an extended home network also comprises a check that the equipment is authorized to execute the application, the uniform resource locator address being provided to the equipment by the device for managing the extended home network if this equipment is authorized to execute the application.

The invention also concerns a computer program comprising instructions to implement the method here above according to any of the particular embodiments described previously, when the program is executed by a processor. The method can be implemented in various ways, in particular in hardware or software form.

This program can use any programming language, and can take the form of source code, object code or intermediate code between source code and object code, such as in a partially compiled form or in any other desirable form whatsoever.

The invention also concerns a recording medium or information carrier readable by a computer, and comprising instructions of a computer program as mentioned here above. The recording medium mentioned here above may be any entity or device capable of storing the program. For example, the medium may comprise storage means, such as a ROM, for example a CD ROM or a microelectronic circuit ROM, or a magnetic recording medium, for example a hard disk. On the other hand, the recording media may correspond to a transmissible medium such as an electrical or optical signal, which may be conveyed via an electrical or optical cable, by radio or by other means. The programs according to the invention can be downloaded in particular on an Internet type network.

Alternatively, the recording media may correspond to an integrated circuit in which the program is incorporated, the circuit being adapted to execute or be used in the execution of the method in question.

BRIEF DESCRIPTION OF THE DRAWINGS

Other purposes, characteristics and advantages of the invention shall appear more clearly from the following explanatory description, given by way of a simple illustratory and non-exhaustive example, in relation to the figures, of which.

DETAILED DESCRIPTION OF CERTAIN ILLUSTRATIVE EMBODIMENTS

The general principle of the invention is based on management that is centralized and controlled by the network operator with whom the user has taken out a subscription, for the consumption of content services, in an extended home network. In this way, such content services are no longer connected to the user's main home network alone, but become accessible from a secondary network, in which the user is roaming, while remaining controlled by the operator, both in terms of quality of service and security of rights. Such content services are therefore no longer associated with the user's home alone, but may be more generally connected to a concept of user's home, which may be multi-site, and multi-person.

Figure 1:
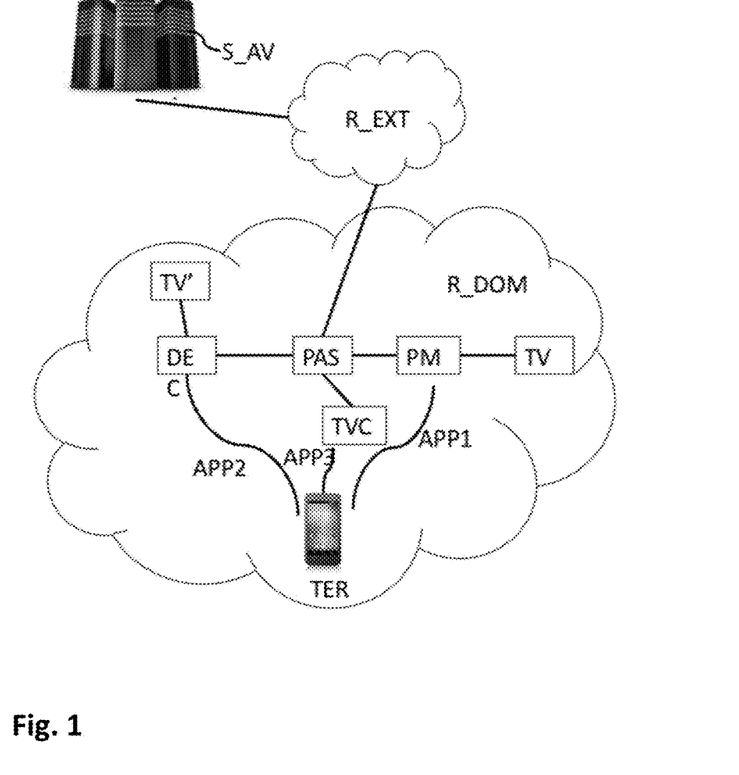
FIG. 1 illustrates an implementation environment enabling the launch of a multi-screen application in a home network according to the prior art.

FIG. 1 illustrates an example of an implementation environment enabling the launch of a multi-screen application in a home network according to the prior art.

Multi-screen application shall mean a multimedia content application installed on a piece of audiovisual equipment, also called multimedia equipment hereafter, such as for example a connected television (TVC), enabling the consumption of a program or multimedia content service, also called TV service, to which the user has subscribed.

The multi-screen application is adapted to receive and decode multimedia content streams and to render them on the multimedia equipment or any other restitution device. Such a multi-screen application is adapted to be controlled by another application, called control application, installed on a mobile terminal, for example a smartphone or tablet, distinct from the multimedia equipment, and adapted to also execute other types of application. For this, each piece of multimedia equipment has its own correspondence table multi-screen application/multi-screen application launch URL. For example, such a correspondence table is based on the DIAL protocol. The URL associated with the multi-screen application enables the multimedia equipment receiving a launch command to obtain the data from the multi-screen application to execute the multi-screen application. For example, in the case of a multi-screen application to view video content, the URL enables access to the video content.

The environment illustrated in FIG. 1 comprises in particular a home network R-DOM implemented by a home gateway PAS connected to the external data communication network R_EXT of a network operator. The home network R-DOM comprises a certain number of home multimedia equipment connected to the home network R_DOM of the home gateway PAS, and in particular:

- a multimedia gateway PM, for example a HDMI (High-Definition Multimedia Interface) multimedia key or an MHL (Mobile High-Definition Link) connector or a TV stick, connected to the home gateway PAS in wired or WiFi mode and connected to a TV screen, for example a television, and adapted to execute a multi-screen application on reception of a launch request from a dedicated control application APP1 installed on a terminal, for example the mobile terminal TER,
- a connected television TVC connected to the home gateway PAS in wired or WiFi mode, and adapted to execute a multi-screen application on reception of a launch request from a dedicated control application APP3 installed on the terminal TER,
- a decoder DEC connected to the home gateway PAS in wired or WiFi mode and to a screen TV', the decoder DEC being adapted to execute a multi-screen application on reception of a launch request from a dedicated control application APP2 installed on the terminal TER.

For example, in order to play a video through the multimedia gateway PM on the TV screen, the user uses their mobile terminal TER on which they have for example installed the application APP1 dedicated to this service. At the user's request, the application APP1 communicates with the multimedia gateway PM to ask for the video to be played. The multimedia gateway PM then recovers a URL enabling access to the video. The video content is transmitted by a multimedia server S_AV, via the communication network R_EXT, the home gateway PAS and the home network R_DOM to the multimedia gateway PM, in order to be displayed via the TV screen.

According to other examples, a similar mechanism can be implemented to execute multi-screen applications on the household equipment DEC and TVC respectively.

It therefore appears that according to the prior art, on launching a multi-screen application, each application is managed independently via a dedicated control application (APP1, APP2, APP3) installed on a terminal. In other terms, it is the control application (APP1, APP2, APP3) itself that decides on its launch, at the user's request, and on the equipment on which to execute the application, the multimedia gateway PM in the example described here.

When the home network comprises several pieces of equipment enabling the launch of multi-screen applications, and these applications are each launched without any control, for example without control of the bandwidth available within the home network, the quality of service of the home network risks being deteriorated, without any explanation for the user. This is even more problematic if one considers an extended home network, which comprises not only the equipment from the home network R_DOM, but also one or several pieces of equipment from a secondary network, which could be home network of a secondary residence of the user or another network on which they are roaming.

In addition, each piece of multimedia equipment (PM, DEC, TVC) has its own correspondence table associating a multi-screen application with a URL address enabling access to the multi-screen application data. It is therefore not possible to launch a specific multi-screen application on a piece of multimedia equipment other than the piece of multimedia equipment with which it has been associated.

Figure 2A:
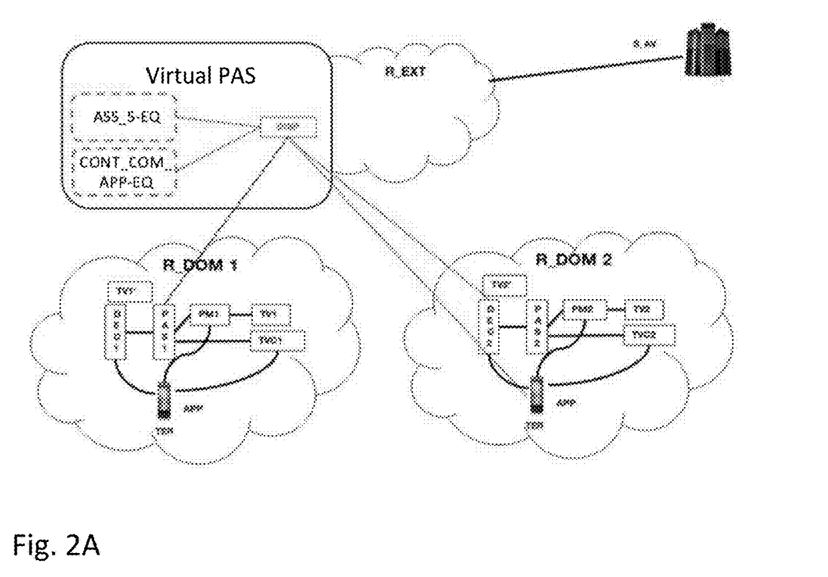
FIG. 2A illustrates an example of an environment to implement the method for managing an extended home network according to one embodiment of the invention.
Figure 2B:
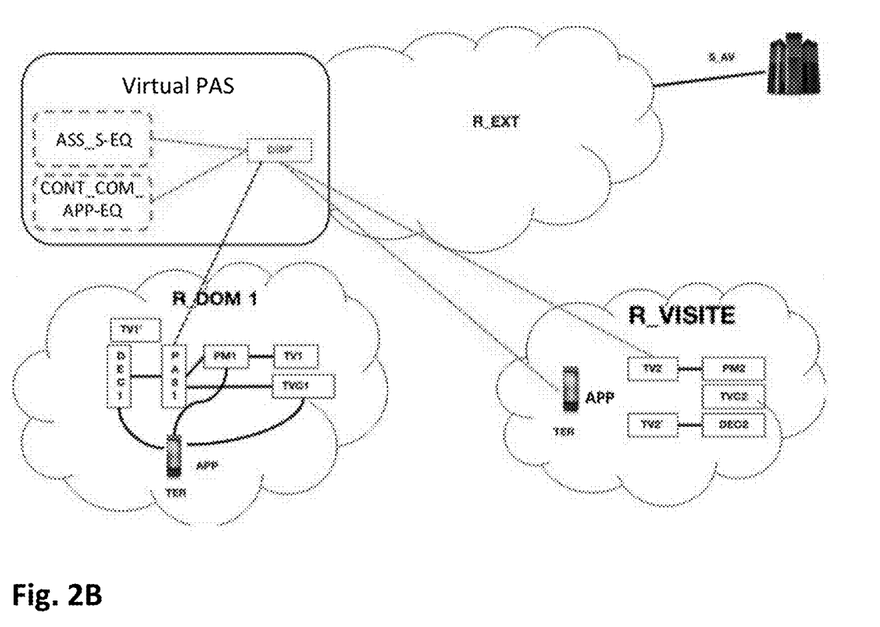
FIG. 2B illustrates another example of an environment to implement the method for managing an extended home network according to another embodiment of the invention.

FIGS. 2A and 2B illustrate examples of an implementation environment to implement the method for managing an extended home network according to particular embodiments of the invention.

The extended home network comprises a main home network R_DOM1 and a secondary network. In FIG. 2A, the secondary network is a secondary home network R_DOM2, corresponding to the local communication network of a secondary residence of the user, such as for example their vacation home. In FIG. 2B, the secondary network is a visited mobile network R_VISITE, or the Internet, without a secondary operator gateway. It may for example concern the home network of a third party or a friend whom the user is visiting, or a public Internet access WiFi network in which the user is roaming. The environment of the main R_DOM1 and secondary R_DOM2 home or visited R_VISITE networks, comprises the same household equipment as that presented in relation to FIG. 1.

Extended home network shall mean an entity comprising a main home network R_DOM1, attached for example to the user's main residence, at least one secondary network, such as for example a secondary home network R_DOM2 attached to a secondary residence of the user (FIG. 2A) or a visited mobile or fixed network R_VISITE (FIG. 2B), and resources dedicated to the user in the service operator's network R_EXT (Cloud).

Indeed, through SDN and NFV approaches, it is possible to separate the services and infrastructure hosting them into different contexts. The SDN approach consists in separating the stream management layer from the data layer that transmits the network traffic, the purpose of this dissociation being to create a centralized and programmable network. This approach makes it possible to define necessary secure links (throughput rate, security of access, encryption, etc.) between the local components in the home network and the remote components in the extended network. A service administration portal enables the user to activate a service over a given period via a service administration portal based on a rationale of consumption per use and no longer per subscription. The NFV approach consists in virtualizing network services to eliminate dedicated material.

In this way, as described previously, by applying these software approaches to the home network of a user, it is possible to develop an extended home network and to broaden the home gateway so that it includes new services such as: "Super LAN", "Parental Control", and "Virtual NAS".

A service can then be activated on a local component (such as for example a home gateway) or on a network component available in the operator's network in a virtualized infrastructure (such as for example a virtual gateway) in "Cloud Computing" or in "Edge Computing".

According to the invention, the extended home network also comprises a device DISP for managing the extended home network, configured to implement the method for managing the extended home network according to any one of the particular embodiments of the invention described here above.

In the embodiment according to the invention described here, the device DISP for managing the extended home network is comprised in a virtual gateway PAS located in the operator's communication network (Cloud) R_EXT. This is then referred to as a virtual device for managing an extended home network.

According to the invention, the user can configure, from the main home network R_DOM1, remote access to content consumption services or multi-screen applications to which they have subscribed, for equipment on the extended network, such as for example the multimedia equipment (PM2, TVC2, DEC2) of a secondary network (secondary home network R_DOM2 or a visited mobile or fixed network R_VISITE).

In other terms, according to the invention, the virtual device DISP is configured to receive, via the main home network R_DOM1, a request to associate at least one piece of equipment (DEC2, PM2, TVC2) from the secondary network (R_DOM2, R_VISITE) with at least one multi-screen application. The device DISP then memorizes a list of multimedia equipment from the secondary network (R_DOM2, R_VISITE) in association with at least one multi-screen application.

For this, the device DISP has an API (Application Programming Interface) to:
- configure remote access to multi-screen applications subscribed by the user from their main home network R_DOM1. The user can then configure, for example via a service administration portal, the multimedia services they can access outside their main residence;
- manage multimedia equipment making it possible to visualize given digital content (TV programs, subscription VOD) or to consume a given Internet service (YouTube®, NetFlix®, etc.), and integrating in particular the management of qualities available on the multimedia equipment through the operator control of the extended home network configuration. In one example, this control is static (subscription for access to fixed and mobile network) and/or dynamic (bandwidth test from a mobile application APP);
- configure the communication session between the mobile application APP and the multimedia equipment selected by the client.

The device DISP according to the invention is also configured to receive a request to launch a multi-screen application, from a mobile terminal TER, via the extended home network, i.e. to provide, either via the main home network R_DOM1, or the secondary network (R_DOM2, R_VISITE), the mobile terminal TER, on reception of the launch request, with the list of multimedia equipment ASS_S-EQ from the extended home network having access to the multi-screen applications requested, and to receive, from the mobile terminal TER, an identifier of the equipment that the user has chosen to consume a program or digital content.

In particular, according to the invention, when the mobile terminal TER is connected to a secondary network (R_DOM2, R_VISITE), the device DISP is configured to provide the mobile terminal TER, on reception of the launch request, with the list of multimedia equipment ASS_S-EQ from the secondary network (R_DOM2, R_VISITE) having access to the multi-screen applications requested.

In other terms, the virtual gateway PAS, via the device DISP for managing the extended home network according to the invention, has, for each multi-screen application, a list of equipment ASS_S-EQ from the extended home network on which the multi-screen application can be executed. For this, the device DISP asks the user, via the terminal TER, on which piece of equipment from the extended home network the multi-screen application requested must be executed.

In one particular embodiment of the invention, the device DISP is also configured to memorize a list of multi-screen applications, each one associated with a uniform resource locator address (URL), and to provide one piece of equipment from the extended home network (PM1, TVC1, DEC1, PM2, TVC2, DEC2) or the mobile terminal TER, with the URL enabling the launch of the multi-screen application.

According to the particular embodiment described here, when a user wishes to launch a multi-screen application, the user uses an application APP that is not specific to the multi-screen application in question, but specific to the device DISP for managing the extended home network according to the invention. For example, the user has installed the application APP on their mobile terminal TER. At the user's request, the application APP communicates with the device DISP located in the virtual gateway PAS, via the local network in which the user exists, to request the execution of the desired multi-screen application, for example by selecting the multi-screen application in a list displayed by the application APP.

In one example, the user is in their main residence. At the user's request, the application APP communicates with the device DISP located in the virtual gateway PAS, via the gateway PAS1 of the main home network R_DOM1.

In another example in connection with FIG. 2A, when the user is in their secondary residence, such as for example their vacation home, the application APP communicates with the device DISP located in the virtual gateway PAS, via the gateway PAS2 of the secondary home network R_DOM2.

In another example in connection with FIG. 2B, when the user uses a visited mobile or fixed network R_VISITE while roaming, such as for example a friend's home network, the application APP communicates directly with the virtual device DISP located in the virtual gateway PAS.

The virtual gateway PAS is then responsible for obtaining the URL (Uniform Resource Locator) enabling access to the desired multi-screen application. For example, according to one particular embodiment of the invention, the virtual gateway PAS has a correspondence table associating, for each multi-screen application available on a piece of equipment from the extended home network, a URL enabling access on the communication network R_EXT to the data of the multi-screen application.

According to another particular embodiment of the invention, the virtual gateway PAS, via the virtual device DISP, checks if the multi-screen application requested can be launched on a piece of multimedia equipment. For example, for certain multi-screen applications, the device DISP has an API (Application Programming Interface) enabling access to a rights server associated with the multi-screen application and checks if the user's access rights to the multi-screen application are valid. For example, the device DISP checks, via a user identifier provided by the operator with whom the user is subscribed, if the user is authorized to access the multi-screen application: for example if their subscription with the operator allows this, or in the case of paid access, if their subscription with the operator allows access to paid applications.

In this way, according to this particular embodiment of the invention, when the mobile terminal TER is connected to a secondary home network R_DOM2 (FIG. 2A) or when roaming on a visited network R_VISITE (FIG. 2B), the device DISP located in the virtual gateway PAS checks if the multi-screen application requested can be launched on a piece of multimedia equipment (PM2, TVC2, DEC2) from the secondary network (R_DOM2, R_VISITE) selected by the user. After receiving the identifier of the multimedia equipment selected, the virtual management device DISP consults the communication settings CONT_COM_APP-EQ between the application and the multimedia equipment selected (licenses, encryption, etc.), which are then transmitted to the terminal TER, via the control application APP.

According to another example, the home gateway PAS implements a policy of parental control. For example, based on the identity of the user of the terminal TER, this identity being then comprised in a response to an authentication request in response to the request to launch the multi-screen application, it checks if this user is authorized to access the multi-screen application requested, in relation to the time, for example, or if the user is authorized to use the multimedia equipment requested.

When the virtual gateway PAS has obtained the URL of the application requested, possibly in relation to the multimedia equipment on which the multi-screen application must be launched, the URL is transmitted either directly to the multimedia equipment, or to the terminal TER, which sends it to the multimedia equipment.

In the embodiment according to FIG. 2A, the application content is then transmitted to the multimedia equipment, at the request of the latter to the URL received, for example by the multimedia server S_AV, via the communication network R_EXT, the home gateway PAS2 and the home network R_DOM2.

In the embodiment according to FIG. 2B, the content of the application is then transmitted to the multimedia equipment via the communication network R_EXT, the mobile terminal TER and the visited network R_VISITE.

The principle of the invention is described here in the case of a multi-screen application. However, the principle of the invention also applies to any other application or service that can be launched via a control application installed on a terminal whose execution is remotely performed on another piece of equipment from the extended home network.

Figure 3:
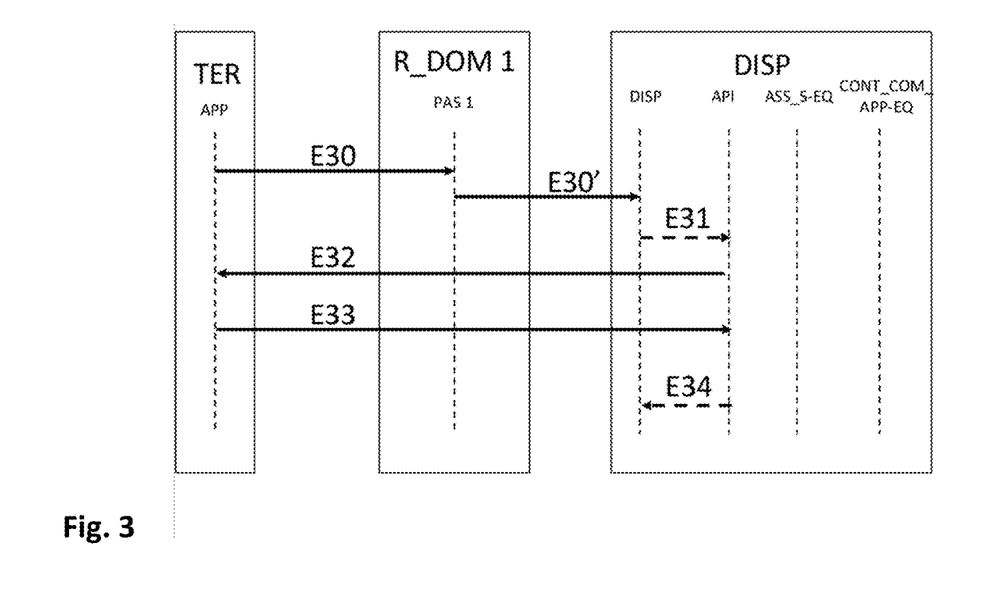
FIG. 3 illustrates steps of the initialization phase of the method for managing an extended home network according to one particular embodiment of the invention.

FIG. 3 illustrates the steps of the initialization phase of the method for managing an extended home network according to one particular embodiment of the invention. The method for managing an extended home network is implemented by a device DISP for managing an extended home network, for example comprised in the virtual gateway PAS located in the operator's network (Cloud).

In this embodiment, it is considered that the multi-screen application, which is also called here multimedia content application, is installed on a piece of multimedia equipment from the extended home network (DEC1, PM1, TVC1, DEC2, PM2, TVC2) and the control application APP is installed on a mobile terminal TER, such as for example a smartphone. The user is in their main residence and their mobile terminal TER is therefore connected to the main home network R_DOM1.

The method comprises a pre-initialization phase (not represented) during which the device DISP for managing an extended home network memorizes a correspondence table associating multi-screen applications with a uniform resource locator address (URL) enabling a piece of multimedia equipment from the extended home network (R_DOM1, R_DOM2, R_VISITE) to access, via the operator's communication network, for example R_EXT in FIGS. 2A and 2B, the data enabling the execution of the multi-screen application on said multimedia equipment.

For example, the correspondence table may be provided by the operator with whom the user is subscribed. According to another example, the correspondence table is created and updated when a piece of multimedia equipment associated with a multi-screen application is registered on the extended home network (R_DOM1, R_DOM2, R_VISITE). Each multi-screen application memorized comprises an identifier associated with a URL. By default, each multi-screen application is associated with a piece of multimedia equipment from the extended home network (R_DOM1, R_DOM2, R_VISITE). This multimedia equipment can be associated by default by the operator or by the user during the initialization phase described here above, or even when registering the multimedia equipment on the extended home network.

For each multi-screen application for which an identifier is memorized in the virtual device DISP for managing the extended home network, a list of multimedia equipment from the extended home network on which the multi-screen application can be executed is memorized.

In particular, according to one embodiment of the invention, during the initialization phase, the user, via a graphical user interface on the control application APP installed on their mobile terminal TER, configures a remote access mode to the TV services or multi-screen applications subscribed. In other terms, from their main home network R_DOM1, the user can configure access to TV services to which they have subscribed, when they are outside their main residence, in other terms, when they are on their secondary home network R_DOM2 (FIG. 2A) or roaming on a visited network R_VISITE (FIG. 2B).

For this, in a step E30, the control application APP installed on the mobile terminal TER sends, via the home gateway PAS1 of the main home network R_DOM1 (E30'), a request to configure remote access mode to the virtual device DISP.

During a step E31, the device DISP begins configuring remote access by redirecting the request to configure remote access to the API described previously for user display via the graphical user interface of the control application APP.

The virtual management device DISP checks the authenticity of the control application APP during a step E32, for example, by checking the authenticity of the license. In other terms, it checks for example if the control application APP is an application authenticated by a competent authority. In particular, the virtual management device DISP can check if the license is a license authorized by the network operator with whom the user is subscribed.

During a step E33, via the graphical user interface of the control application APP, the user configures their access rights to the TV services subscribed, when they wish to use these services outside the main home network R_DOM1. The user can also configure the quality of digital content that is available by the multimedia equipment from the secondary network, as well as the settings of communication sessions between the control application APP and the multimedia equipment selected by the user.

In one example, at the user's request, the device DISP associates at least one piece of equipment (DEC2, PM2, TVC2) from the secondary network, such as for example the secondary home network R_DOM2, or the visited network R_VISITE, with a chosen multi-screen application. In this way, from their main home network, for each piece of equipment from the secondary network, the user can associate or prevent access rights to and consumption of TV services. The device DISP then memorizes a list ASS_S-EQ of equipment from the secondary network in association with the multi-screen applications to which the equipment outside the main home network R_DOM1 has access.

Figure 4A:
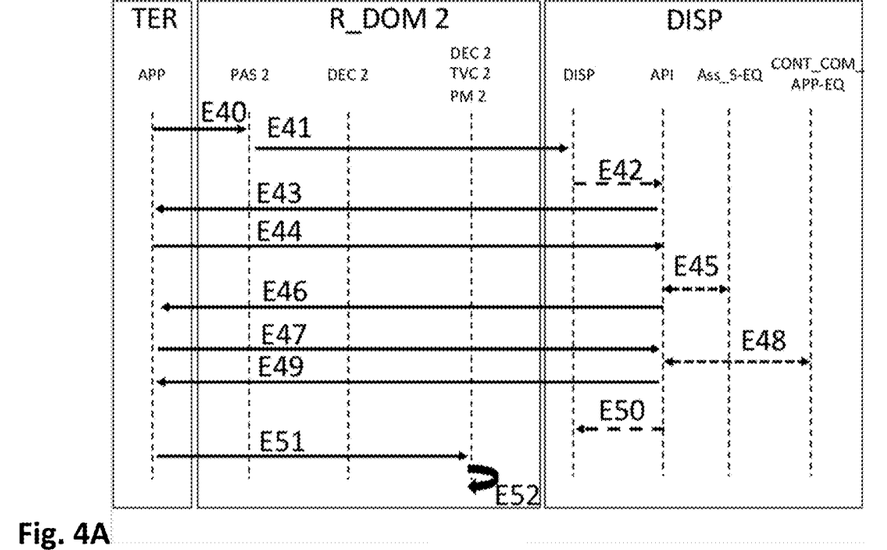
FIG. 4A illustrates steps of the discovery phase of the method for managing an extended home network according to one particular embodiment of the invention in connection with FIG. 2A.
Figure 4B:
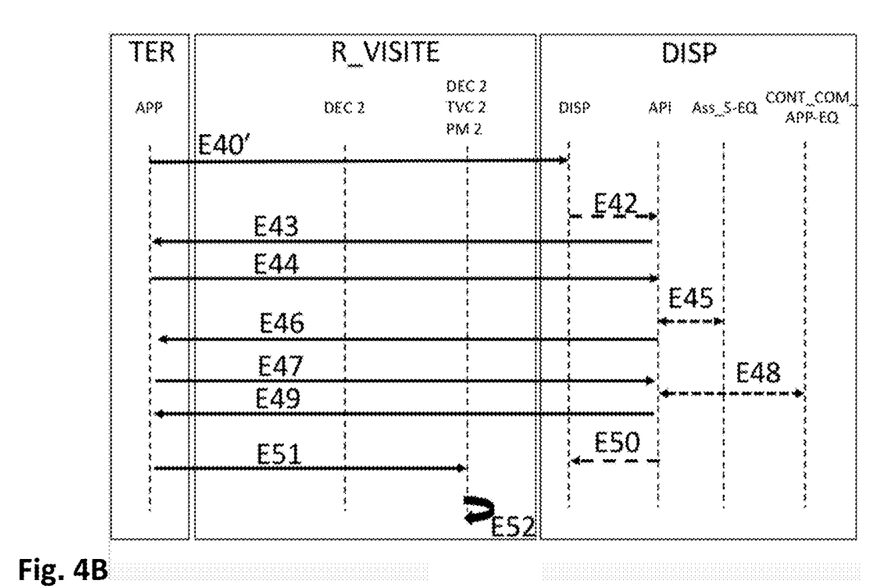
FIG. 4B illustrates steps of the discovery phase of the method for managing an extended home network according to one particular embodiment of the invention in connection with FIG. 2B.

FIGS. 4A and 4B illustrate the steps in the discovery phase of the method for managing a home network according to one particular embodiment of the invention in connection with FIGS. 2A and 2B respectively.

In the embodiment in connection with FIG. 4A, the user wishes to access a service from the control application APP installed on their mobile terminal, such as for example control the visualization of a program or content on a visualization terminal (TVC2, DEC2/TV2', PM2/TV2) on the secondary home network R_DOM2 and invokes the virtual device DISP. For this, during a step E40, the control application APP sends a request to launch the multi-screen application which transits through the home gateway PAS2 during a step E41. This launch request, for example, is a request to subscribe to the multi-screen application. It comprises in particular a multi-screen application identifier enabling the management device DISP to identify the multi-screen application targeted by the request.

During a step E42, the device DISP begins the discovery of the multimedia equipment supporting the TV service requested by directing the request towards the APIs described previously for user display via the graphical user interface of the control application APP.

During steps E43 and E44, the device DISP then authenticates the application APP, as in step E32 of the initialization phase (FIG. 3). It also checks if the user's access rights to the multi-screen application requested are valid.

In a step E45, the device DISP then retrieves the list ASS_S_EQ of the multimedia equipment from the secondary home network R_DOM2 that is compatible with the TV service requested and checks the access rights of the equipment to the service requested.

During a step E46, the device DISP for managing the extended home network transmits to the terminal TER the list of multimedia equipment associated with the multi-screen application requested. The user of the terminal TER can therefore select the desired multimedia equipment. For example, if the user has requested the launch of a Video on Demand application, and the management device DISP has memorized the following list of multimedia equipment compatible with this application: the decoder DEC2, the connected television TVC2, the multimedia gateway PM2 of FIG. 2A, the user can choose one of the pieces of multimedia equipment presented.

Alternatively, the user can choose several pieces of multimedia equipment, for example in the case of the same audiovisual content visualized in different rooms, or of an online game accessed by two users of the home network.

During a step E47, the device DISP for managing the extended home network receives, from the terminal TER, an identifier of the multimedia equipment selected.

After reception of the identifier of the multimedia equipment selected, the virtual management device DISP consults, in a step E48, the communication settings between the application and the multimedia equipment selected (licenses, encryption, etc.) CONT_COM_APP-EQ, which are then transmitted, during a step E49, to the terminal TER, via the control application APP.

These settings are configured previously by the user during the initialization phase.

In one particular embodiment of the invention, the device DISP for managing the extended home network checks if the multimedia equipment selected is authorized to execute the multi-screen application requested.

For example, a parental control policy can be implemented. In this case, the launch request also comprises an identifier provided by the user of the terminal TER making it possible to identify if the user is authorized to launch the multi-screen application, or to use the audiovisual equipment selected, for example.

According to another example, access rights to the multi-screen application requested are checked. The access rights can be of different types, for example they can correspond to the access rights to the user's application based on their identifier, or to access rights to content in relation to the user's profile, or to the access right to encoding quality in relation to the characteristics of the audiovisual equipment or the throughput available. Indeed, during the discovery phase, the device DISP for managing the extended home network knows the throughput of the secondary home network R_DOM 2, possibly by interrogating the access gateway to services PAS2, and can authorize or prohibit certain qualities (for example 8k, 4k, etc.).

If it is confirmed that the audiovisual equipment selected is authorized to execute the multi-screen application requested or if no control is implemented, the device DISP for managing the extended home network obtains the URL associated with the multi-screen application requested from its correspondence table.

According to one particular embodiment, the URL also depends on the audiovisual equipment selected. For example, a URL can be associated with specific formats that are more appropriate for certain types of audiovisual equipment than other types of audiovisual equipment. For example, for the same audiovisual content, it is possible to use a transport protocol for the audiovisual content, or encoding of the audiovisual content or a DRM protection solution that differ in relation to the audiovisual equipment.

The discovery procedure therefore ends in a step E50 and the virtual device DISP for managing the extended home network transmits the URL obtained to the multimedia equipment selected, or to the terminal TER. The user can then launch, at a step E51, visualization of the content requested on the multimedia equipment selected, for example the connected television TVC2, and then visualize the content during a step E52.

In the embodiment in connection with FIG. 4B, the secondary network is a visited mobile or fixed network R_VISITE not comprising a home gateway PAS2 (FIG. 2B). The visited network can be a mobile or fixed network, a "third party" network (friend, hotel, rental, etc.) or the Internet. In particular, the access gateway to services on the visited network is not involved.

In this embodiment, the mobile terminal TER contacts the device DISP for managing the extended home network directly in a step E40'.

In this way, from the control application APP on their mobile terminal TER, the user wishes to control the visualization of a program or content on the visualization terminal (TVC2, DEC2/TV2', PM2/TV2) on a visited network and invokes the virtual device DISP via the Internet R_EXT.

During the discovery phase, the device DISP for managing the extended home network knows the throughput of the visited network by identifying the user session (5G, 4G+ access, Internet, etc.) and the user profile (for example a fixed subscription associated with a mobile subscription in the case of a convergent offering), then possibly by launching a bandwidth test on the application.

During execution of the multi-screen application, the management device periodically checks if the bandwidth of the extended home network or the access network is sufficient to enable execution of the multi-screen application requested. This particular embodiment helps avoid impacting the other already ongoing services provided by the extended home network and ensures guaranteed quality service during execution of the multi-screen application. If this is not the case, the virtual device DISP for managing the extended home network can implement a service management policy in relation for example to a priority associated with the services and the multi-screen applications. In this way, if the multi-screen application takes priority over the other ongoing services on the extended home network, the management device can end these other services, or decrease their quality to enable execution of the multi-screen application requested.

When a parental control mechanism is implemented at the level of the virtual management device DISP, it can also filter requests to launch certain multimedia content in relation to metadata comprised in audiovisual streams, to avoid the broadcast of multimedia content unsuitable for a young audience. Filtering can also intervene in relation to time or duration constraints, or to the price to be paid for the multimedia content.

According to this particular embodiment of the invention, the list of multi-screen applications and audiovisual equipment available to execute these multi-screen applications is updated each time a piece of multimedia equipment connects to the extended home network of the virtual gateway PAS.

In this way, the method described in relation to the FIGS. 4A and 4B also comprises a step (not represented) during which a registration notification for a piece of multimedia equipment in the extended home network is received by the virtual gateway PAS.

In the case where the virtual device DISP for managing the extended home network is different from the gateway PAS, the registration notification for the multimedia equipment is transmitted by the virtual gateway to the virtual management device DISP.

Such a registration notification comprises one piece of capability information concerning the multimedia equipment having emitted the notification. This capability information enables the virtual gateway PAS to determine which multi-screen applications the multimedia equipment is able to execute. For example, the capability information may indicate the identifier of a multi-screen application, or a type of audiovisual equipment, for example a version of an operating system of a piece of multimedia equipment or an identifier of a type of multimedia equipment, or characteristics of the screen or the speakers of the multimedia equipment. Based on the type of multimedia equipment, the virtual gateway PAS can therefore determine which multi-screen applications can be executed by this multimedia equipment, for example by referring to a database listing the multi-screen applications compatible with a type of multimedia equipment.

In this way, for each multi-screen application for which an identifier is memorized in the virtual gateway PAS, the list of multimedia equipment from the extended home network associated with this multi-screen application is updated in relation to the capability information concerning the audiovisual equipment which is registered in the extended home network.

Figure 5:
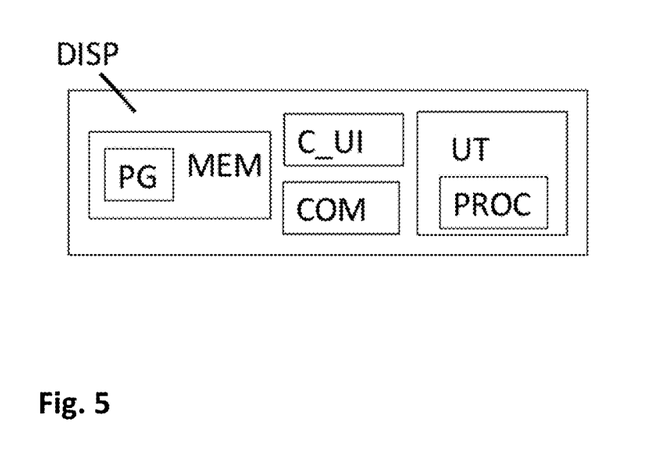
FIG. 5 illustrates a device for managing an extended home network according to one particular embodiment of the invention.

FIG. 5 illustrates the simplified structure of a device DISP for managing an extended home network according to one particular embodiment of the invention. Such a virtual device for managing an extended home network is configured to implement the method for managing an extended home network according to any one of the particular embodiments of the invention described here above.

According to one particular embodiment of the invention, the device DISP has the conventional architecture of a computer and comprises in particular a memory MEM, a processing unit UT, equipped for example with a processor PROC, and controlled by the computer program PG stored in the memory MEM. The computer program PG comprises instructions to implement the steps of the method for managing an extended home network such as described previously, when the program is executed by the processor PROC.

At initialization, the code instructions of the computer program PG are for example loaded into a memory before being executed by the processor PROC. The processor PROC of the processing unit UT implements in particular the steps of the method for managing an extended home network according to any one of the particular embodiments described in relation to FIGS. 3, 4A or 4B, according to the instructions of the computer program PG.

The memory MEM is configured to memorize a list of multi-screen applications that can be executed by a piece of audiovisual equipment from the extended home network, and in particular from the secondary network, such as for example a secondary home network or a visited mobile or fixed network. Such a list comprises an identifier of a multi-screen application associated with a uniform resource locator address (URL) enabling access to the data of the multi-screen application.

According to one particular embodiment of the invention, the memory MEM is also configured to memorize a list of audiovisual equipment from the extended home network in association with at least one multi-screen application on the list.

Alternatively, a multi-screen application can be associated with several different URLs that depend on the audiovisual equipment that is likely to execute it. In this way, for the same multi-screen application, different URLs are associated with at least two different pieces of audiovisual equipment from the list of audiovisual equipment associated with the multi-screen application.

According to one particular embodiment of the invention, the device DISP comprises a communication module COM configured to establish communications with an IP network, and/or a home gateway.

In particular, the communication module COM enables the device DISP to receive data relative to a multi-screen application executed by a piece of audiovisual equipment from the extended home network (DEC1, PM1, TVC1 or DEC2, PM2, TVC2 in FIG. 2A). For example, such a multi-screen application may be an audiovisual service.

According to one particular embodiment of the invention, the communication module COM also enables the device DISP to receive update information concerning access rights to a multi-screen application from, for example, the server of the multi-screen application provider, and/or an update of the list of multi-screen applications memorized and associated URLs. Such update information can be received in notification ("push" mode) or in synchronization mode in response to a request from the device DISP ("pull" mode).

According to one particular embodiment of the invention, the device DISP comprises a communication port C_UI able to establish a communication link with interaction devices and receive command signals relative to an audiovisual service or a multi-screen application to be executed by a piece of audiovisual equipment from the extended home network. For example, such a communication port enables the device DISP to receive a command to launch a multi-screen application from the mobile terminal TER in FIG. 2B and to communicate with it.

The device DISP also comprises communication ports (not represented) enabling the device DISP to communicate with audiovisual equipment from the home network, and in particular to transmit to this equipment a URL enabling the launch of a multi-screen application on such a piece of audiovisual equipment.

For example, such communication ports may correspond to Ethernet ports, USB sockets, Bluetooth modules, NFC, Infrared, WIFI, etc.

The invention claimed is:

1. A management device for managing an extended home network, said extended home network comprising a main home network for which a user has taken out a subscription to services with a communication network operator and at least one secondary network, corresponding to a local communication network visited by the user, said at least one secondary network comprising at least one piece of equipment adapted to execute at least one application from a uniform resource locator address, said uniform resource locator address enabling said at least one piece of equipment to access, via the operator's communication network, at least one piece of data enabling execution of said at least one application on said at least one piece of equipment, said management device is configured to:
   receive, via said main home network, a request to associate said at least one piece of equipment from said secondary network with said at least one application;
   store a list of equipment from said secondary network in association with said at least one application;
   receive a request to launch said at least one application, from a terminal, via said secondary network, said request comprising an identifier of said at least one application;
   provide said terminal, on reception of said launch request, with said list of equipment; and
   receive, from said terminal, an identifier of a piece of equipment from said list.

2. The management device for managing an extended home network of claim 1, also configured to:
   store a list of applications comprising at least one identifier of said at least one application, said identifier being associated with said uniform resource locator address; and
   provide said at least one piece of equipment or said terminal, via said secondary network, with said uniform resource locator address associated with said at least one identifier of said at least one application.

3. The management device for managing an extended home network of claim 1, in which the list of equipment from said secondary network associated with said at least one application is updated on reception of a registration notification for a new piece of equipment in said secondary network in relation to a piece of capability information concerning said new piece of equipment comprised in the registration notification.

4. The management device for managing an extended home network of claim 1, also configured to check if said at least one piece of equipment is authorized to execute said application, said uniform resource locator address being provided to said at least one piece of equipment by the device for managing the extended home network if said at least one piece of equipment is authorized to execute said application.

5. Equipment placed in a communication network and comprising resources dedicated to the extended home network of a user subscribed with a communication network operator, said at least one piece of equipment comprising a management device of claim 1.

6. A management method of managing an extended home network, said extended home network comprising a main home network for which a user has taken out a subscription to services with a communication network operator and at least one secondary network, corresponding to a local communication network visited by the user, said at least one secondary network comprising at least one piece of equipment adapted to execute at least one application based on a uniform resource locator address, said uniform resource locator address enabling said at least one piece of equipment to access, via the operator's communication network, at least one piece of data enabling the execution of said at least one application on said at least one piece of equipment, said method comprising:
   receiving, via said main home network, a request to associate said at least one piece of equipment from said secondary network with said at least one application;
   storing a list of equipment from the secondary network in association with said at least one application;
   receiving a request to launch said at least one application, from a terminal, via the secondary network, said request comprising said identifier of said at least one application,
   providing to said terminal, on reception of said launch request, said list of equipment; and
   receiving, from said terminal, an identifier of one piece of equipment from said list.

7. The management method of managing an extended home network of claim 6, also comprising:
   storing a list of applications comprising at least one identifier of said at least one application, said identifier being associated with said uniform resource locator address; and
   providing, to said at least one piece of equipment or to said terminal, via said secondary network, said uniform resource locator address associated with said at least one identifier of said at least one application.

8. The management method of managing an extended home network of claim 6, also comprising:
   receiving a registration notification for a new piece of equipment in the secondary network comprising a piece of capability information concerning said new equipment; and
   updating said list of equipment from the secondary network associated with said at least one application in relation to said capability information concerning said new piece of equipment.

9. The management method of managing an extended home network of claim 6, also comprising:
   checking that said at least one piece of equipment is authorized to execute said application, said uniform resource locator address being provided to said at least one piece of equipment by said device for managing the extended home network if said at least one piece of equipment is authorized to execute said application.

10. A computer comprising a processor and a memory, the memory storing code instructions of a computer program comprising instructions to implement the method of claim 6, when the program is executed by a processor.

11. A non-transitory processor-readable recording medium on which the computer program of claim 10 is recorded.

* * * * *

UNITED STATES PATENT AND TRADEMARK OFFICE
CERTIFICATE OF CORRECTION

Page 1 of 1

PATENT NO. : 11,784,844 B2
APPLICATION NO. : 17/352119
DATED : October 10, 2023
INVENTOR(S) : Emmanuel Gouleau et al.

It is certified that error appears in the above-identified patent and that said Letters Patent is hereby corrected as shown below:

On the Title Page

Column 1 (Prior Publication Data), Line 2, below "Dec. 23, 2021" insert Item -- (30) Foreign Application Priority Data Jun. 23, 2020 (FR) ........ 2006548 --, as a new field entry.

In the Specification

Column 4, Line 41, delete "not" and insert -- no --.

Column 18, Line 10, delete "FIGS." and insert -- FIG. --.

Signed and Sealed this
Twentieth Day of February, 2024

Katherine Kelly Vidal
*Director of the United States Patent and Trademark Office*